United States Patent
Hansen et al.

(10) Patent No.: US 10,886,975 B2
(45) Date of Patent: Jan. 5, 2021

(54) SINGLE-CARRIER WIDEBAND BEAMFORMING METHOD AND SYSTEM

(71) Applicant: PERASO TECHNOLOGIES INC., Toronto (CA)

(72) Inventors: Christopher James Hansen, Los Altos, CA (US); Nelson Costa, Grimsby (CA)

(73) Assignee: PERASO TECHNOLOGIES INC., Toronto (CA)

( * ) Notice: Subject to any disclaimer, the term of this patent is extended or adjusted under 35 U.S.C. 154(b) by 0 days.

(21) Appl. No.: 16/382,585

(22) Filed: Apr. 12, 2019

(65) Prior Publication Data

US 2019/0319677 A1    Oct. 17, 2019

Related U.S. Application Data

(60) Provisional application No. 62/657,202, filed on Apr. 13, 2018.

(51) Int. Cl.
*H04B 7/04* (2017.01)
*H01Q 3/26* (2006.01)
*H04J 1/06* (2006.01)

(52) U.S. Cl.
CPC ............. *H04B 7/04* (2013.01); *H01Q 3/2605* (2013.01); *H04J 1/06* (2013.01)

(58) Field of Classification Search
CPC ...... H01Q 3/2605; H04B 7/04; H04B 7/0617; H04B 7/0626; H04B 7/0634; H04J 1/06
See application file for complete search history.

(56) References Cited

U.S. PATENT DOCUMENTS

| | | | | |
|---|---|---|---|---|
| 2009/0257384 A1* | 10/2009 | Lee | ....................... | H04B 7/0452 370/329 |
| 2011/0142147 A1* | 6/2011 | Chen | .................... | H04B 7/0417 375/260 |
| 2012/0008613 A1* | 1/2012 | Lee | ....................... | H04B 7/0417 370/338 |
| 2012/0033592 A1* | 2/2012 | Kim | ....................... | H04B 7/043 370/310 |
| 2013/0258873 A1* | 10/2013 | Stauffer | ................ | H04L 1/0034 370/252 |

(Continued)

OTHER PUBLICATIONS

Y. Ghasempour, C. R. C. M. da Silva, C. Cordeiro and E. W. Knightly, "IEEE 802.11ay: Next-Generation 60 GHz Communication for 100 Gb/s Wi-Fi," in IEEE Communications Magazine, vol. 55, No. 12, pp. 186-192, Dec. 2017, doi: 10.1109/MCOM.2017.1700393. (Year: 2017).*

(Continued)

*Primary Examiner* — Kashif Siddiqui
(74) *Attorney, Agent, or Firm* — Perry + Currier

(57) ABSTRACT

A method in a transmitter station for establishing a wireless link with a receiver station includes: sending beamforming training data to the receiver station; responsive to sending the beamforming training data, receiving from the receiver station: beamforming feedback data; and a beamforming feedback mode indicator selected from (i) a multi-subcarrier feedback mode, and (ii) a single carrier feedback mode; when the beamforming feedback mode indicator corresponds to the single carrier feedback mode, obtaining beamforming parameters based on the beamforming feedback data.

5 Claims, 3 Drawing Sheets

(56) References Cited

U.S. PATENT DOCUMENTS

Figure 1:
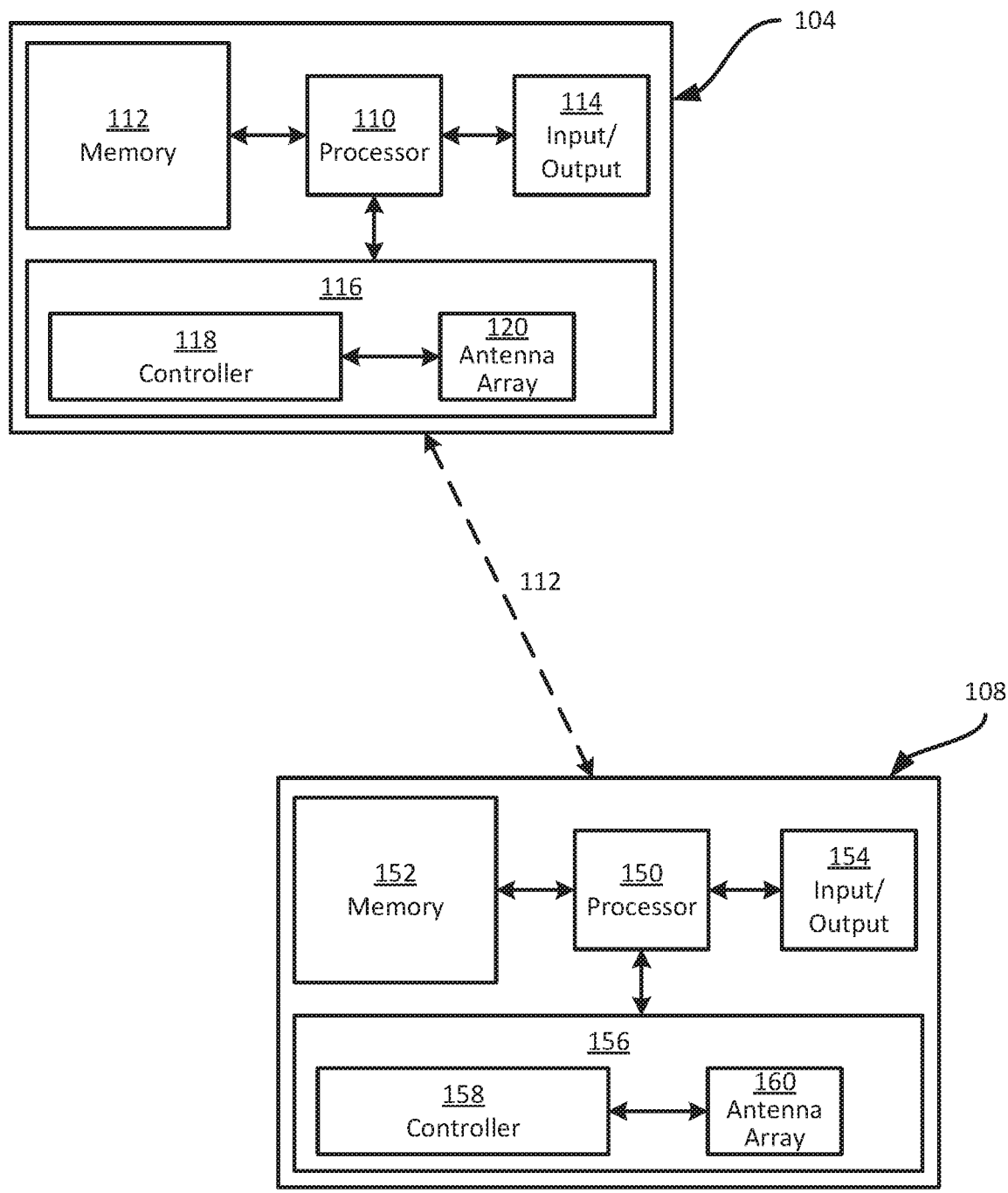

| | | | |
|---|---|---|---|
| 2016/0226622 A1 | 8/2016 | Kasher et al. | |
| 2019/0273535 A1* | 9/2019 | Yun | H04B 7/0617 |
| 2019/0326972 A1* | 10/2019 | Yun | H04B 7/0617 |
| 2020/0044724 A1* | 2/2020 | Kim | H04W 72/04 |
| 2020/0099428 A1* | 3/2020 | Ciochina | H04B 7/0626 |

OTHER PUBLICATIONS

C. R. C. M. Da Silva, J. Kosloff, C. Chen, A. Lomayev and C. Cordeiro, "Beamforming Training for IEEE 802.11 ay Millimeter Wave Systems," 2018 Information Theory and Applications Workshop (ITA), San Diego, CA, 2018, pp. 1-9, doi: 10.1109/ITA.2018.8503112. (Year: 2018).*

P. Zhou et al., "IEEE 802.11ay-Based mmWave WLANs: Design Challenges and Solutions," in IEEE Communications Surveys & Tutorials, vol. 20, No. 3, pp. 1654-1681, thirdquarter 2018, doi: 10.1109/COMST.2018.2816920. (Year: 2018).*

EPO, Extended European Search Report, dated Aug. 22, 2019 re European Patent Application No. 19168722.7.

Kim, Jinmin (LG Electronics), "CR on Hybrid beamforming feedback", IEEE Draft; Nov. 18, 0441-02-00AY-CR-ON-Hybrid_Beamiforming-Feedback, IEEE-SA Mentor, Piscataway, NJ, USA, vol. 802.11 ay, No. 2, May 7, 2018, pp. 1-15.

Nitsche, Thomas, et al. "IEEE 802.11 ad: directional 60 GHz communication for multi-Gigabit-per-second Wi-Fi." IEEE Communication Magazine 52.12 (2014): 132-141.

Sunwoong, Yun (LG Electronics): "CR on Hybrid beamforming feedback", IEEE Draft; 11-18-0441-00-00AY-CR-ON-Hybrid-Beamforming-Feedback, IEEE-SA Mentor, Piscataway, NJ, USA, vol. 802.11ay, Mar. 8, 2018, pp. 1-14.

* cited by examiner

SINGLE-CARRIER WIDEBAND BEAMFORMING METHOD AND SYSTEM

CROSS-REFERENCE TO RELATED APPLICATIONS

This application claims priority from U.S. provisional patent application No. 62/657,202, filed Apr. 13, 2018 and entitled "SINGLE CARRIER DIGITAL BEAMFORMING", the contents of which is incorporated herein by reference.

FIELD

The specification relates generally to wireless communications, and specifically to a single-carrier wideband beamforming method and system.

BACKGROUND

Wireless communications can be conducted in a wide variety of environments, particularly by mobile devices whose physical environments can be fluid. Various modulation mechanisms (e.g. orthogonal frequency-division multiplexing (OFDM)) are implemented by such devices to enhance the speed and/or reliability of wireless communications. Such modulation mechanisms may not be suitable in every communication environment, however, and may result in an increased computational load on the devices.

SUMMARY

An aspect of the specification provides a method in a transmitter station for establishing a wireless link with a receiver station, the method comprising: sending beamforming training data to the receiver station; responsive to sending the beamforming training data, receiving from the receiver station: beamforming feedback data; and a beamforming feedback mode indicator selected from (i) a multi-subcarrier feedback mode, and (ii) a single carrier feedback mode; when the beamforming feedback mode indicator corresponds to the single carrier feedback mode, obtaining beamforming parameters based on the beamforming feedback data.

A further aspect of the specification provides a method in a receiver station device for establishing a wireless link with a transmitter station, comprising: receiving beamforming training data from the transmitter station; determining an active beamforming mode selected from (i) a multi-subcarrier feedback mode, and (ii) a single carrier feedback mode; responsive to determining that the active beamforming mode is the single carrier feedback mode, generating an uncompressed time-domain channel representation based on the beamforming training data; and sending, to the transmitter station, (i) beamforming feedback data based on the an uncompressed time-domain channel representation, and (ii) an indicator of the active beamforming mode.

BRIEF DESCRIPTIONS OF THE DRAWINGS

Figure 2:
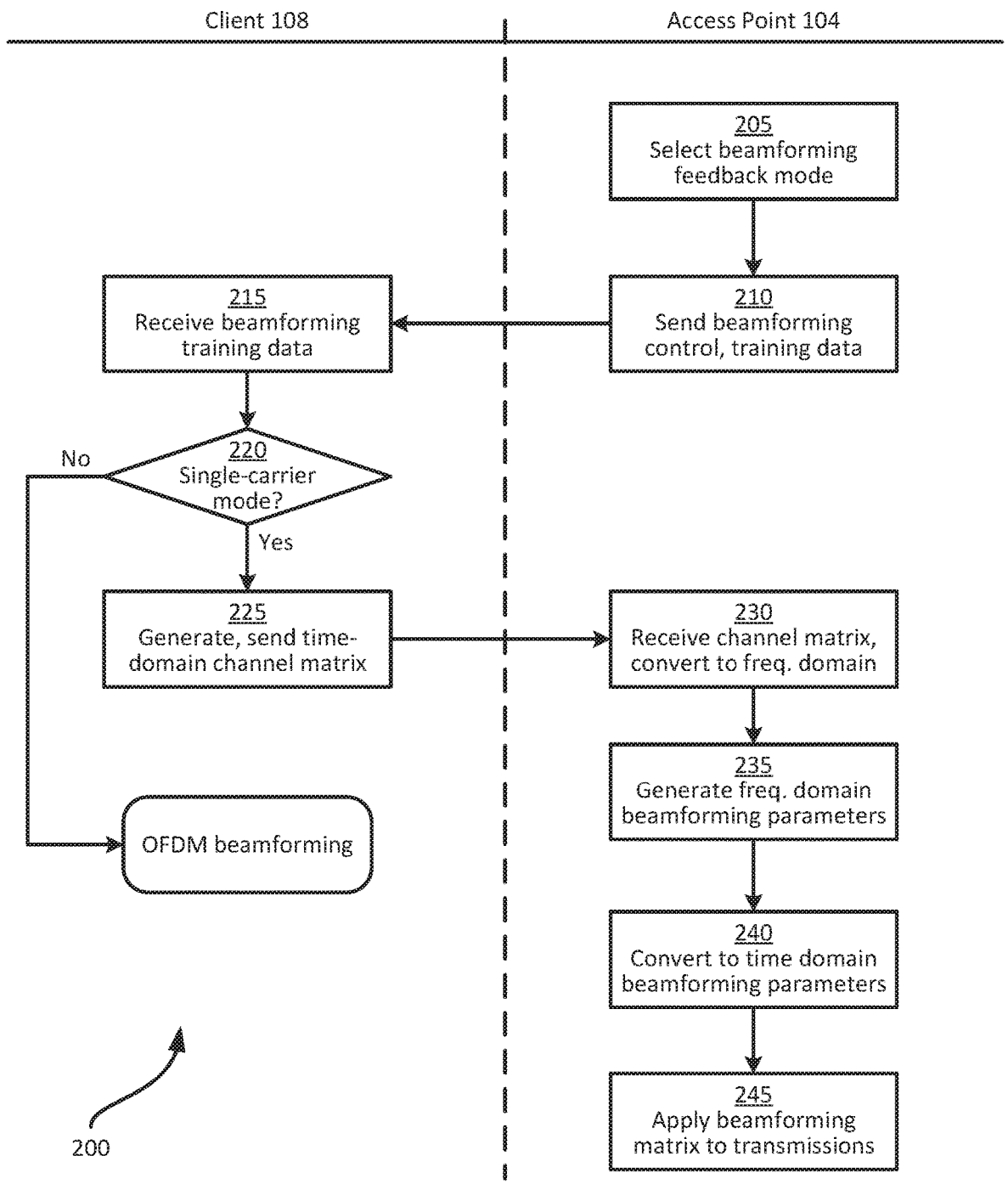
Figure 3:
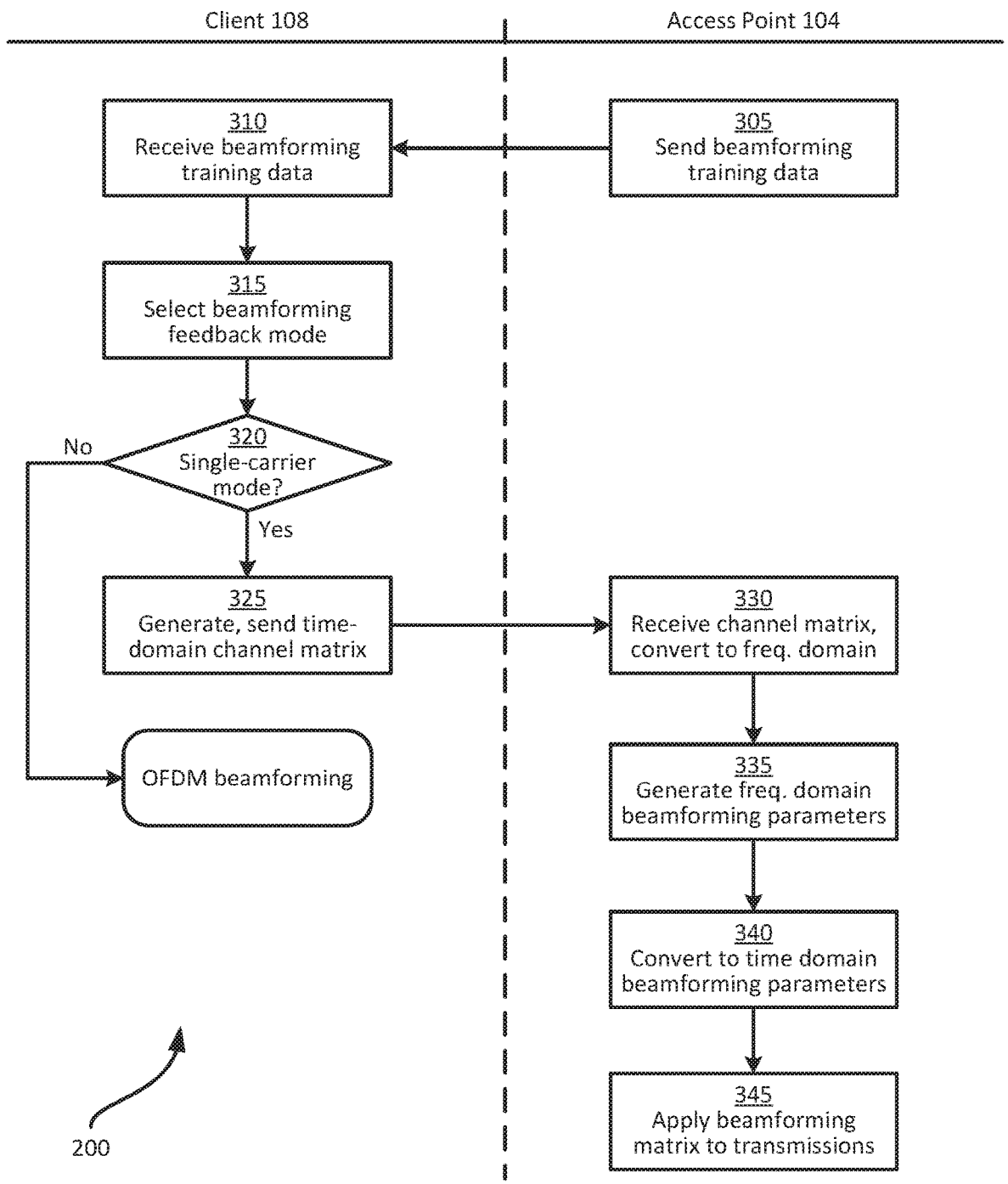

Embodiments are described with reference to the following figures, in which:

FIG. 1 depicts a wireless communication system;
FIG. 2 depicts an example beamforming method; and
FIG. 3 depicts a further example beamforming method.

DETAILED DESCRIPTION

FIG. 1 depicts a wireless communications system 100, including a plurality of wireless devices. In particular, FIG. 1 illustrates an access point 104 connected with a client device 108 via a wireless link 112. The access point 104 can be, for example, a wireless router connecting the client device 108 to a wide area network (not shown) such as the Internet. The access point 104 may also be, for example, a media server, a home computer, a mobile device, and the like. The client device 108, meanwhile, can be a mobile device such as a smartphone, a tablet computer and the like. The client device 108 may also be an access point itself, for example in implementations in which the devices 104 and 108 are components in a backhaul infrastructure. More generally, the wireless devices 104 and 108 can include any suitable combination of computing devices with wireless communication assemblies suitable for communicating with one another. The devices 104 and 108 are referred to herein as an access point and a client device simply for illustrative purposes. The access point 104 may also be referred to herein as a transmitter station or a beamformer station, while the client device 108 may also be referred to herein as a receiver station or a beamformee station.

The devices 104 and 108 include respective central processing units (CPU) 110 and 150, also referred to as processors 110 and 150. The processors 110 and 150 are interconnected with respective non-transitory computer readable storage media; such as memories 112 and 152, having stored thereon various computer readable instructions for performing various actions. The memories 112 and 152 each include a suitable combination of volatile (e.g. Random Access Memory or RAM) and non-volatile memory (e.g. read only memory or ROM, Electrically Erasable Programmable Read Only Memory or EEPROM, flash memory). The processors 110 and 150 and the memories 112 and 152 each comprise one or more integrated circuits.

The devices 104 and 108 also include respective input and output devices generally indicated as input/output assemblies 114 and 154. The input and output assemblies 114 and 154 serve to receive commands for controlling the operation of the devices 104 and 108 and for presenting information, e.g. to a user of the client device 108. The input and output assemblies 114 and 154 therefore include any suitable combination of a keyboard or keypad, a mouse, a display, a touchscreen, a speaker, a microphone, and the like. In other embodiments, the input and output assemblies 114 and 154 may be connected to the processors 110 and 150 via a network, or may simply be omitted. For example, the access point 104 may simply omit the input/output assembly 114.

The devices 104 and 108 further include respective wireless communications assemblies 116 and 156 interconnected with the processors 110 and 150. The assemblies 116 and 156 enable the devices 104 and 108, respectively, to communicate with other computing devices. In the present example, the assemblies 116 and 156 enable such communication according to wireless standards employing frequencies of around 60 GHz (also referred to as WiGig) and wide channel bandwidths (e.g. exceeding 1 GHz per channel). Examples of such standards are the IEEE 802.11ad standard, and enhancements thereto (e.g. 802.11ay).

The communications assemblies 116 and 156 include respective controllers 118 and 158 in the form of one or more integrated circuits, configured to establish and maintain communications links with other devices (e.g., the link 112). The controllers 118 and 158 are configured to process outgoing data for transmission via respective antenna arrays 120 and 160 (e.g. each including a phased array of antenna elements) and to receive incoming transmissions from the arrays 120 and 160 and process the transmissions for communication to the processors 110 and 150. The controllers 118 and 158 can therefore each include a baseband processor and one or more transceivers (also referred to as radio processors), which may be implemented as distinct hardware elements or integrated on a single circuit.

In order to enable communications with another device, each of the devices 104, 108 is configured to perform certain functionality to establish a communications link such as the link 112 shown in FIG. 1. Among the functions performed by the devices 104 and 108 in establishing the link 112 is the determination of beamforming parameters for use by the device 104 when transmitting data to the device 108. As will now be apparent, the device 108 can also determine beamforming parameters for use when transmitting data to the device 104, according to the same mechanisms discussed below. However, the generation of beamforming parameters will be discussed below in connection with their generation for use by the device 104 to transmit data to the device 108.

Turning now to FIG. 2, a beamforming method 200 will be discussed in connection with its performance within the system 100. In particular, certain blocks of the method 200 are performed by the device 104, while other blocks of the method 200 are performed by the device 108, as indicated in FIG. 2.

At block 205, the access point 104 is configured to select a beamforming feedback mode, from two available modes: a single-carrier mode, and a multiple-subcarrier mode; which may also be referred to as an OFDM mode. The OFDM beamforming feedback mode itself is not the subject of the present disclosure, and will therefore not be discussed in greater detail herein. The access point 104 can select a feedback mode according to any suitable mechanism. For example, the access point 104 may store a preferred feedback mode that is automatically selected at block 205. In other examples, the mode may be selected based on a number of client devices to which the access point 104 is connected (e.g. with the single-carrier mode being preferred for smaller numbers of client devices).

Having selected the beamforming feedback mode, at block 210 the access point 104 is configured to transmit beamforming data to the client device 108, as well as beamforming control data including an indicator of the selected beamforming feedback mode. The training data, as will be apparent to those skilled in the art, can include any suitable number of predefined training sequences (e.g. Golay sequences or the like) appended to any suitable data frame(s), including Null frames. The beamforming feedback mode indicator can be, for example, a single bit contained in a predetermined field or subfield of the above-mentioned frames. In other examples, the beamforming feedback mode indicator is transmitted in a separate frame, such as a frame containing a capabilities element transmitted before the above-mentioned training data.

At block 215, the client device 108 is configured to receive the beamforming training data (at the antenna array 160). At block 220 the client device 108 (more specifically, the controller 158) is configured to determine whether the single-carrier beamforming feedback mode mentioned above is active. The client device 108 performs block 220 by examining the above-mentioned indicator received from the access point 104. When the determination at block 220 is negative, indicating that the OFDM beamforming mode is active, the client device 108 proceeds according to OFDM-based beamforming mechanisms, examples of which will occur to those skilled in the art. As noted above, OFDM-based beamforming is not the primary subject of this disclosure, and thus for the purposes of this disclosure the method 200 ends following a negative determination at block 220.

When the determination at block 220 is affirmative, the method 200 proceeds to block 225. At block 225, the client device 108 is configured to generate and send, to the access point 104, feedback data comprising an uncompressed time-domain channel representation. The feedback data includes a set of polynomial digital filters; more specifically, the feedback data includes a polynomial digital filter for each pair of antenna elements of the antenna arrays 120 and 160. Thus, if the antenna array 120 includes eight elements and the antenna array 160 includes four elements, the feedback data contains thirty-two polynomial digital filters. As will now be apparent, conventional feedback data includes frequency-domain beamforming parameters in a compressed form rather than the above-mentioned uncompressed time-domain channel representation. The computational burden imposed on the client device 108 may be reduced in this way. Various techniques will occur to those skilled in the art for generating the above-mentioned uncompressed time-domain channel representation.

At block 230, the access point 104 receives the beamforming feedback information generated at block 225 by the client device 108. The access point 104 is further configured to convert the uncompressed time-domain channel representation to the frequency domain, for example by applying a fast Fourier transform (FFT) or a discrete Fourier transform (DFT). The access point 104 therefore obtains a frequency domain channel representation in the form of a matrix H, as follows:

$$H_k = \begin{bmatrix} h_{00}(e^{j2\pi\frac{k}{n}}) & h_{01}(e^{j2\pi\frac{k}{n}}) \\ h_{10}(e^{j2\pi\frac{k}{n}}) & h_{11}(e^{j2\pi\frac{k}{n}}) \end{bmatrix}$$

In the equation above, k is a frequency bin, which will range from zero to n−1, where n is the length of the discrete Fourier transform.

At block 235, the access point 104 is configured to generate beamforming parameters in the frequency domain, for example by computing the singular value decomposition (SVD) of the frequency-domain channel representation. As will be apparent to those skilled in the art, the SVD computation at the access points 104 yields the following:

$$H_k = U_k S_k V_k^H$$

The matrix V corresponds to the frequency-domain beamforming parameters. At block 240, the access point 104 converts the frequency-domain beamforming parameters to the time domain, for example by applying an inverse FFT. The time-domain beamforming parameters may be expressed as follows, in which "l" is the frequency bin index:

$$v_{xy}(k) = \sum_{l=0}^{n-1} V_{xy}(l) e^{-j2\pi\frac{kl}{n}}$$

At block 245, the access point 104 applies the time-domain beamforming parameters to subsequent transmissions to the client device 108. For example, the access point 104 can be configured to determine a steering matrix (e.g. a set of complex weights, each corresponding to one of the elements of the antenna array 120) from the time-domain beamforming parameters. The weights of the steering matrix can then be applied to the antenna array 120 for subsequent transmissions to the client device 108.

In the performance of the method 200 as set out above, the access point 104 is configured to select the beamforming feedback mode. In other examples, the client device 108, rather than the access point 104, selects the beamforming feedback mode; as discussed below in connection with FIG. 3.

Turning to FIG. 3, a beamforming method 300 is illustrated. As above, certain blocks of the method 300 are performed by the device 104, while other blocks of the method 300 are performed by the device 108, as indicated in FIG. 3.

At block 305, the access point 104 sends beamforming training data to the client device 108, as described above in connection with block 210. However, the access point 104 does not select a beamforming feedback mode in the illustrated example. Instead, having received the beamforming training data at block 310 (as described earlier in connection with block 215), the client device 108 selects a beamforming feedback mode at block 315. The selection may be based on the same considerations as discussed above in connection with block 205.

At block 320, the client device 108 proceeds with the generation of beamforming feedback based on which feedback mode was selected, as discussed above in connection with block 220. When the single-carrier mode is selected, the client device performs block 325, and the access point 104 performs blocks 330-345, which correspond to blocks 225 and blocks 230-245, respectively. The uncompressed time-domain channel representation sent to the access point 104 at block 325, in the present example, includes an indication of the selected beamforming feedback mode (e.g. the control bit mentioned earlier).

In still further examples, the client device 108, rather than the access point 104, is configured to generate the time-domain beamforming parameters. That is, the client device 108 performs blocks 230-240 and/or blocks 330-340, and sends the resulting time-domain beamforming parameters to the access point 104. The access point 104, in such embodiments, simply applies the time-domain beamforming parameters.

Those skilled in the art will appreciate that in some embodiments, the functionality of the processors 100 and 150, and/or the controllers 118 and 158, may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method in a receiver station device for establishing a wireless link with a transmitter station, comprising:
   receiving beamforming training data from the transmitter station;
   selecting, at the receiver station, an active beamforming mode selected from (i) a multi-subcarrier feedback mode, and (ii) a single carrier feedback mode, wherein the selection is based on at least one of a stored preferred feedback mode, and a number of devices connected with the receiver device;
   responsive to selecting the single carrier feedback mode as the active beamforming mode, generating an uncompressed time-domain channel representation based on the beamforming training data; and
   sending, to the transmitter station, (i) beamforming feedback data based on the an uncompressed time-domain channel representation, and (ii) an indicator of the active beamforming mode.

2. The method of claim 1, wherein sending the beamforming feedback data comprises sending the uncompressed time-domain channel representation.

3. The method of claim 1, wherein sending the beamforming feedback data comprises:
   generating a frequency-domain representation of the uncompressed time-domain channel representation;
   generating a frequency-domain representation of the beamforming parameters based on the frequency-domain representation of the uncompressed time-domain channel representation; and
   generating the beamforming parameters by converting the frequency-domain representation of the beamforming parameters to the time domain.

4. The method of claim 1, wherein determining the active beamforming mode comprises:
   receiving, with the beamforming training data from the transmitter station, a feedback control parameter indicating the active beamforming feedback mode.

5. A wireless communication device comprising:
   an antenna assembly; and
   a controller coupled to the antenna assembly, the controller configured to:
   receive beamforming training data from the transmitter station;
   select an active beamforming mode selected from (i) a multi-subcarrier feedback mode, and (ii) a single carrier feedback mode, wherein the selection is based on at least one of a stored preferred feedback mode, and a number of devices connected with the receiver device;
   responsive to selecting the single carrier feedback mode as the active beamforming mode, generate an uncompressed time-domain channel representation based on the beamforming training data; and
   send, to the transmitter station, (i) beamforming feedback data based on the an uncompressed time-domain channel representation, and (ii) an indicator of the active beamforming mode.

* * * * *